United States Patent
Long

(10) Patent No.: US 6,751,902 B1
(45) Date of Patent: Jun. 22, 2004

(54) FREEZE PROTECTION COMPOUND FOR FRUIT TREES

(76) Inventor: Gary S. Long, 4302 Scenic Dr., Yakima, WA (US) 98908

(*) Notice: Subject to any disclaimer, the term of this patent is extended or adjusted under 35 U.S.C. 154(b) by 199 days.

(21) Appl. No.: 09/557,044

(22) Filed: Apr. 21, 2000

(51) Int. Cl.⁷ ............................ C09K 3/18; A01G 13/00
(52) U.S. Cl. .................................. 47/2; 252/70; 106/13
(58) Field of Search ...................... 47/2; 252/70; 106/13

(56) References Cited

U.S. PATENT DOCUMENTS

| | | | | |
|---|---|---|---|---|
| 3,669,898 A | * | 6/1972 | Butler | 252/70 |
| 4,219,965 A | * | 9/1980 | Freebairn et al. | |
| 5,709,813 A | * | 1/1998 | Janke et al. | 252/70 |
| 5,876,621 A | * | 3/1999 | Sapienza | 252/70 |
| 5,922,240 A | * | 7/1999 | Johnson et al. | 252/70 |
| 6,299,793 B1 | * | 10/2001 | Hartley et al. | 106/13 |
| 6,315,919 B1 | * | 11/2001 | Sapienza | 106/13 |

FOREIGN PATENT DOCUMENTS

JP   405328859 A   * 12/1993
WO   WO 97/34960   * 9/1997

* cited by examiner

Primary Examiner—Jeffrey L. Gellner
(74) Attorney, Agent, or Firm—Stratton Ballew PLLC

(57) ABSTRACT

A freeze protection compound is provided for application to an agricultural crop. The compound is preferably performed by conventional sprayer techniques. The freeze protection compound includes a fermented biomass material as an active ingredient for the purpose of protecting the agricultural crop from freezing. The fermented biomass is mixed to form the freeze protection compound in a liquid solution The fermented biomass can specifically be a fermented corn product. The fermented corn product is preferably rendered substantially free of ethanol. The freeze protection compound can be applied to the blooms and foliage of the agricultural crop, such as a tree cultivar. Most preferably such a tree cultivar conventionally includes all varieties of orchard and grove cultivated products. An effective amount of the freeze protection compound is applied to the living and growing foliage and can also as preferred be applied to blossoms or bloom sets.

8 Claims, 3 Drawing Sheets

FREEZE PROTECTION COMPOUND FOR FRUIT TREES

TECHNICAL FIELD

The invention relates to a process and composition for the protection of agricultural crops from the damaging effects of freezing temperatures, and more particularly to the use of a fermented cellulosic bio-mass for freeze protecting fruit and vegetables.

BACKGROUND OF THE INVENTION

Cellulosic biomass is a complex mixture of carbohydrate polymers from plant cell walls known as cellulose and hemi-cellulose, plus lignin and a smaller amount of other compounds generally known as extractives. Several industries employ cellulosic biomass for the primary purpose of producing ethanol or ethanol enriched products. The production of ethanol fuels from corn, sugar cane and grains are examples of large scale industrial practices. The wine and beer industries also ferment cellulosic biomass for direct consumer consumption on a large scale.

To produce ethanol from biomass feedstocks, a pretreatment process is used to reduce the feedstock size, break down the hemi-cellulose to sugars, and open up the structure of the cellulose component. The cellulose portion is broken down or hydrolyzed by enzymes into glucose sugar that is fermented to ethanol. The sugars from the hemi-cellulose are also fermented to ethanol.

In practice, roughly two-thirds of each quantity of biomass can be converted to ethanol. The remaining by-product is a fermented biomass material. For grains, this spent biomass is sometimes referred to as "distillers grain." This fermented biomass material can also be referred to as "bottoms" or raffinate and is typically either utilized as a livestock feed or discarded. Prior U.S. patents cite de-icing properties of fermented biomass. U.S. Pat. No. 5,709,812 to Janke et al. discloses a deicing composition made from cheese byproducts, for reducing the buildup of snow and ice on roads, bridges and other outdoor surfaces. U.S. Pat. No. 5,635,101 to Janke et al. discloses a de-icing composition made from corn by-products, for reducing the buildup of snow and ice on roads, bridges and other surfaces. U.S. Pat. No. 5,709,813 to Janke et al. discloses a deicing composition made from by-products of fruits and grains, for reducing the buildup of snow and ice on roads, bridges and other outdoor surfaces. U.S. Pat. No. 4,676,918 to Toth et al. discloses an anti-freeze composition made from a waste product of the alcohol distilling industry, for making surfaces free of snow and ice. These prior patents attempt to provide effective compounds for de-icing but fail to teach any application beyond ice removal.

SUMMARY OF INVENTION

The present invention provides a process and composition for protecting an agricultural crop from freezing. The process of the invention comprises applying an effective amount of a freeze protection compound to the agricultural crop. This application is preferably performed by conventional sprayer techniques. The agricultural crop is broadly defined as a living and growing plant, raised for the production of a commodity. The commodity can be the entire plant or a portion of the plant.

The freeze protection compound includes a fermented biomass material as an active ingredient for the purpose of protecting the agricultural crop from freezing. The fermented biomass is mixed to form the freeze protection compound in a liquid solution containing a concentration of between about 10 volume percent to about 70 volume percent of the fermented biomass. More preferably, the fermented biomass is mixed to form a substantially aqueous solution containing a concentration of approximately 30 volume percent of the fermented biomass.

The fermented biomass can specifically be a fermented corn product. The preferred process of the invention includes rendering the fermented corn product substantially free of ethanol. The ethanol is typically the primary product of a distillation of the fermented biomass and the residual fermented biomass is considered a secondary product. The fermented biomass, substantially free from the ethanol, can then be employed as the agricultural freeze protection compound of the present invention.

A preferred application of the freeze protection compound is to the blooms and foliage of the agricultural crop, such as a tree cultivar. Most preferably such a tree cultivar includes all varieties of orchard and grove cultivated products. An effective amount of the freeze protection compound is applied to the living and growing foliage and can also as preferred be applied to the blooms or bloom sets.

For the present invention, the composition for the freeze protection of an agricultural crop can be alternatively be derived from any biomass material and can include corn, dairy products, viticultural byproducts or forest byproducts.

DETAILED DESCRIPTION OF SPECIFIC EMBODIMENTS

Figure 1:
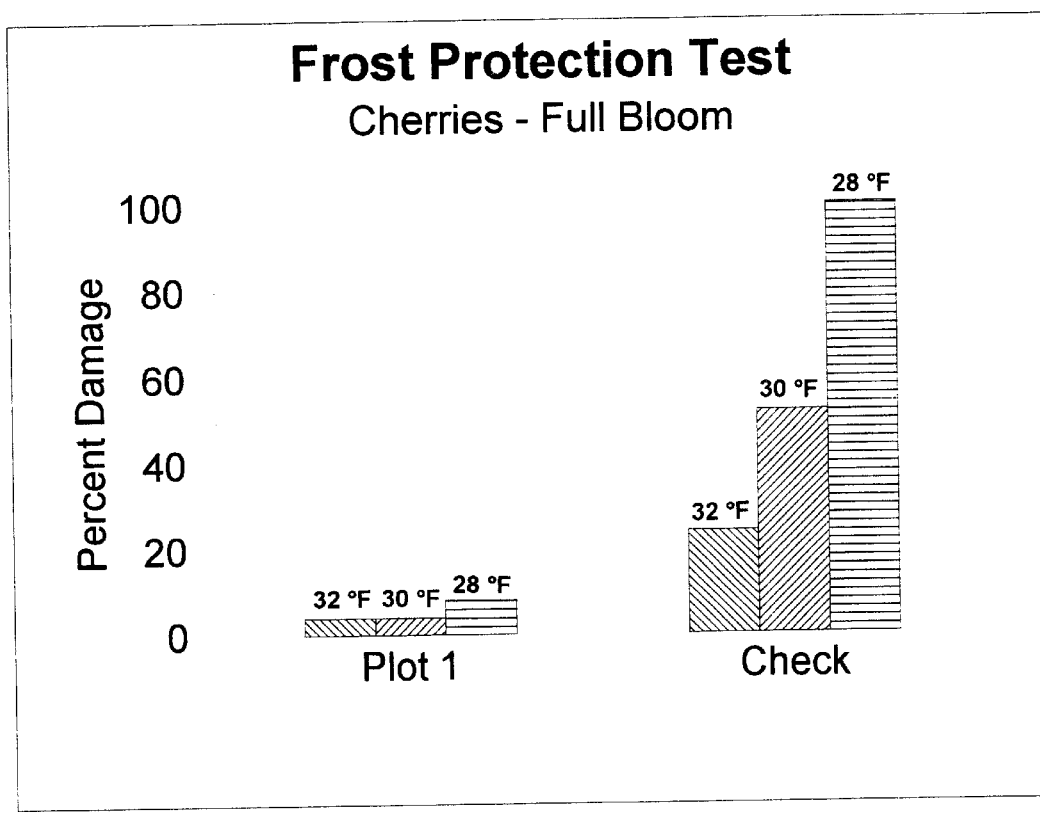
FIG. 1 is a graph of the results of a first orchard test as described in Example 1, and employing an embodiment of the present invention.

The invention provides a process and a composition for protecting an agricultural crop from freezing. The process of the invention comprises applying an effective amount of a freeze protection compound to the agricultural crop. This application is preferably performed by conventional sprayer techniques. These techniques can include aerial spraying or low volume spraying, but preferably utilize a conventional tank sprayer having a tank capacity of approximately 50 to 500 gallons. The agricultural crop is broadly defined as a living and growing plant, raised for the production of a commodity. The commodity can be the entire plant or a portion of the plant.

The freeze protection compound includes a fermented biomass material as an active ingredient for the purpose of protecting the agricultural crop from freezing. The fermented biomass is mixed to form the freeze protection compound in a liquid solution containing a concentration of between about 10 volume percent and about 70 volume percent of the fermented biomass. More preferably, the fermented biomass is mixed to form a substantially aqueous solution containing a concentration of approximately 30 volume percent of the fermented biomass.

The fermented biomass can specifically be a fermented corn product. The preferred process of the invention includes rendering the fermented corn product substantially free of ethanol. The ethanol is typically the primary product of a distillation of the fermented biomass, and the residual fermented biomass is considered a secondary product. The residual fermented biomass, substantially free of ethanol, can then be employed as the agricultural freeze protection compound of the present invention. Most preferably, the fermented and distilled biomass is filtered to remove solids that could impede spraying through conventional agri-chemical distribution systems. Micronizing is also considered as an alterative to filtration.

A preferred application of the freeze protection compound is to the blooms and foliage of the agricultural crop, such as a tree cultivar. Most preferably such a tree cultivar includes all varieties of orchard and grove cultivated products including nuts and fruits. The term "fruits" is employed herein to broadly describe all manner of agricultural products, such as citrus fruits, apples, cherries, peaches, nectarines and pears.

An effective amount of the freeze protection compound is applied to the living and growing foliage and can also as preferred be applied to the blooms or bloom sets. The use of the freeze protection compound for increasing the freeze hardiness of fruits during bloom is a great advantage of this invention.

For the present invention, the composition for the freeze protection of an agricultural crop can be alternatively be derived from any biomass material and can include corn, dairy products, viticultural byproducts or forest byproducts.

Adjuvants can also be added to the freeze protection compound. The adjuvants can facilitate spreading, increase efficiency, and improve the adhesion or sticking properties of the composition. The term "spreader-stickers" is often used to describe this category of adjuvants, which for the purposes of this application can also include oils, salts, anti-foaming agents and surfactants.

A series of field trials comparing the freeze protection compound of the present invention to other alternative chemical thinners were performed to verify efficacy in freeze protection. These trials all included testing the freeze hardiness of tree bloom clusters in a standard freezing chamber. These trials all utilized a corn biomass derived freeze protection compound, prepared and processed in accordance to the present invention. The freeze protection compound was substantially free of ethanol and filtered to facilitate spraying through a typical nozzle orifice.

The standard freezing chamber was calibrated and operated per standard industry practice to accurately assess the hardiness of the tested bloom clusters at temperatures at and below freezing. The test samples were all maintained at approximately 40 degrees F. until placed into the freezing chamber, which was also maintained at approximately 40 degrees F. The freezing chamber was slowly brought down to 32 degrees F. in 2 degree increments and maintained at 32 degrees for at least 20 minutes. A first sample from each test plot and "check" was then removed. The check is a bloom cluster acquired from an adjacent plot of the same tree cultivar in the test plot; however, no freeze protection compound is applied to the check. The temperature in the freezing chamber was slowly reduced by 2 degrees F. to 30 degrees F. and the temperature held again for at least 20 minutes. A sample of the test plot and a check were again removed for examination. The temperature reduction process was again repeated until completion of the test. Three representative freezing chamber trials with bloom clusters from cherry trees are discussed as follows, but are not intended to specifically limit the invention.

EXAMPLE 1

A first field trial to test the effects of the freeze protection composition of the present invention was performed in an orchard located in Zillah, Wash. A row of cherry trees in full bloom were treated at a rate of approximately 30 gallons per acre of freeze protection composition. Samples of the cherry bloom clusters were removed with adjacent rows that did not receive the test application. A result of this trial is shown in the graph of FIG. 1. All treatments for this trial were applied utilizing a standard airblast sprayer having a 100 gallon tank, with 30 gallons of active ingredient diluted with water to 100 gallons.

EXAMPLE 2

Figure 2:
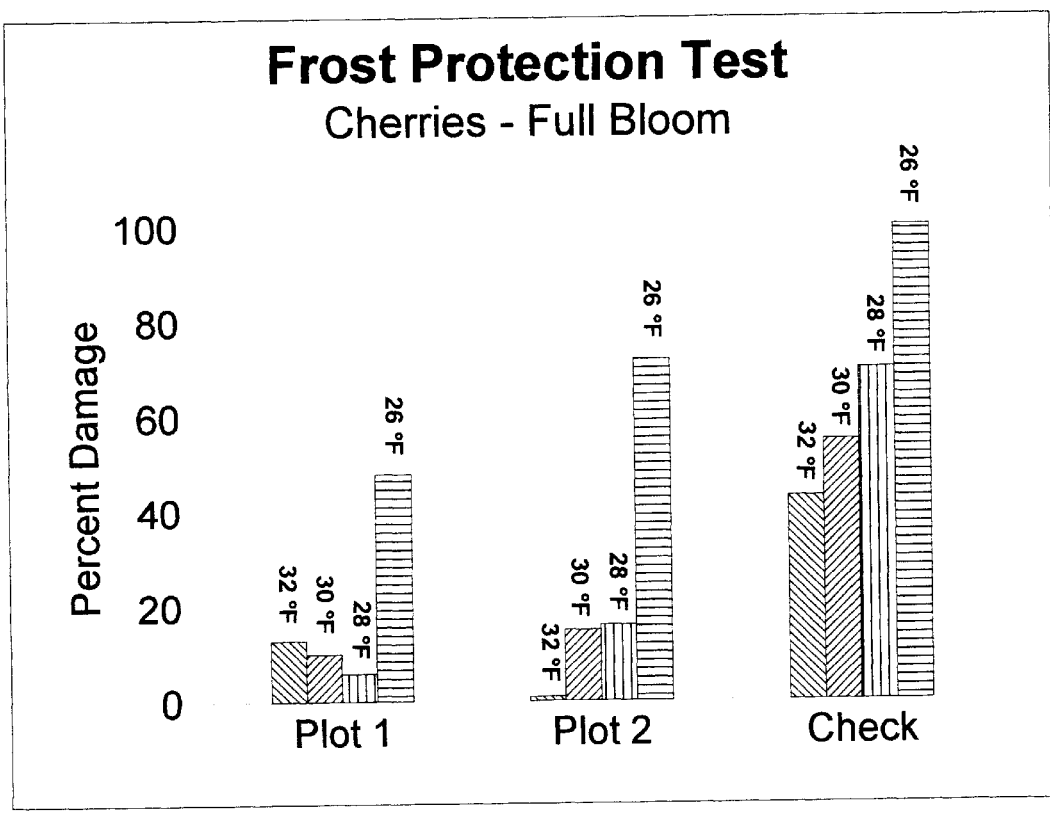
FIG. 2 is a graph of the results of a second field test as described in Example 2, and employing an embodiment of the present invention.

A second field trial to test the effects of the freeze protection composition of the present invention was performed in an orchard located in Zillah, Wash. Two plots of cherry trees in full bloom, each comprising one row, were treated at a rate of approximately 30 gallons per acre of freeze protection composition. Samples of the cherry bloom clusters were removed with adjacent rows that did not receive the test application. A result of this trial is shown in the graph of FIG. 2. All treatments for this trial were applied utilizing a standard airblast sprayer having a 100 gallon tank, with 30 gallons of active ingredient diluted with water to 100 gallons.

EXAMPLE 3

Figure 3:
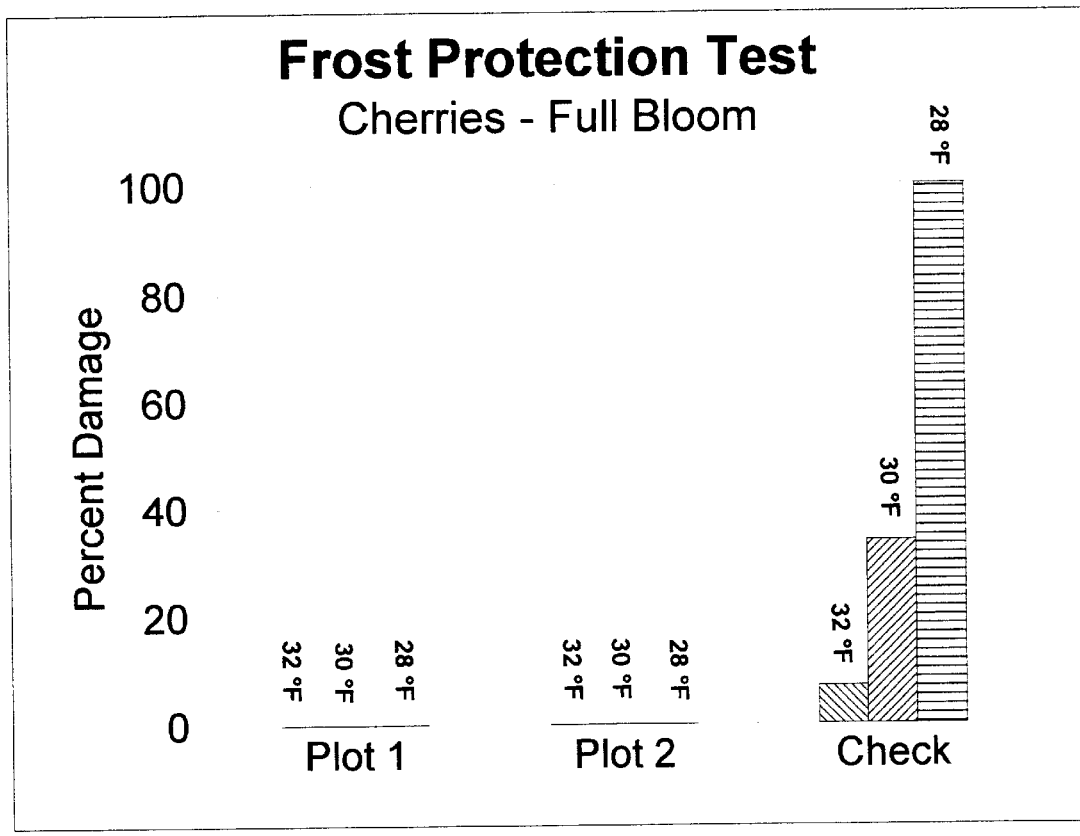
FIG. 3 is a graph of the results of a third orchard test as described in Example 1, and employing an embodiment of the present invention.

A third field trial to test the effects of the freeze protection composition of the present invention was performed in an orchard located in Gleed, Wash. Two plots of cherry trees in full bloom, each comprising a row of cherry trees were treated at a rate of approximately 30 gallons per acre of freeze protection composition. Samples of the cherry bloom clusters were removed with adjacent rows that did not receive the test application. A result of this trial is shown in the graph of FIG. 3. All treatments for this trial were applied utilizing a standard airblast sprayer having a 100 gallon tank, with 30 gallons of active ingredient diluted with water to 100 gallons.

The results of these three field trials indicate that a fermented biomass derived product can provide exceptional freeze protection for certain blooming varieties of cherry cultivars. The inventor of the present invention fully expect other agricultural crops, especially fruits, nuts and vegetables, to also benefit from the freeze protecting properties of the present invention.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A process for protecting an agricultural crop from freezing which comprises applying an effective amount of a freeze protection compound to the agricultural crop, the agricultural crop in a living and growing condition, the freeze protection compound including a fermented biomass material as an active ingredient for the purpose of protecting the agricultural crop from freezing.

2. The process of claim 1, further including mixing the freeze protection compound to the agricultural crop to form a liquid solution containing a concentration of between about 10 volume percent and about 70 volume percent of the fermented biomass.

3. The process of claim 1, further including mixing the freeze protection compound to form a substantially aqueous solution containing a concentration of approximately 30 volume percent of the fermented biomass.

4. The process of claim 1 wherein the process further includes distilling the fermented biomass to form a refined fermented biomass substantially free of ethanol, prior to the use of the fermented biomass in the freeze protection compound.

5. The process of claim 1, wherein the process further includes applying the freeze protection compound to the blooms and foliage of the agricultural crop for the purpose of protecting the blooms and foliage from freezing.

6. A process for protecting a tree bearing an agricultural product from freezing which comprises applying an effective amount of a freeze protection compound to the tree, the tree in a living and growing condition and including a foliage, the freeze protection compound including a fermented biomass material as an active ingredient for the purpose of protecting the foliage of the tree from freezing.

7. The process of claim 6, wherein the fermented biomass is a fermented corn product, and the process further includes rendering the fermented corn product substantially free of ethanol, prior to use in the freeze protection compound.

8. The process of claim 1, wherein the process further includes applying the freeze protection compound to a bloom set of the tree for the purpose of protecting the bloom set from freezing.

\* \* \* \* \*